US012701634B2

(12) United States Patent
Ying et al.

(10) Patent No.: US 12,701,634 B2
(45) Date of Patent: Aug. 4, 2026

(54) IN-VEHICLE CONTROL OF WIRELESS CONNECTION DENSITY

(71) Applicant: Panasonic Avionics Corporation, Irvine, CA (US)

(72) Inventors: Li Ying, Irvine, CA (US); Sidney Chu, Fullerton, CA (US); Nirav Patel, Fullerton, CA (US); He Zheng, Irvine, CA (US); Glen Gee, Irvine, CA (US); Christopher Lyle, Trabuco Canyon, CA (US); Andy Kwong, Tustin, CA (US)

(73) Assignee: Panasonic Avionics Corporation, Irvine, CA (US)

( * ) Notice: Subject to any disclaimer, the term of this patent is extended or adjusted under 35 U.S.C. 154(b) by 616 days.

(21) Appl. No.: 18/060,879

(22) Filed: Dec. 1, 2022

(65) Prior Publication Data

US 2024/0188182 A1     Jun. 6, 2024

(51) Int. Cl.
*H04W 76/32* (2018.01)
*H04W 76/10* (2018.01)

(52) U.S. Cl.
CPC ........... *H04W 76/32* (2018.02); *H04W 76/10* (2018.02)

(58) Field of Classification Search
CPC .............................. H04W 76/32; H04W 76/10
USPC .......................................................... 370/329
See application file for complete search history.

(56) References Cited

U.S. PATENT DOCUMENTS

2013/0005336 A1* 1/2013 Ayotte .................... H04W 4/48
                                                            455/435.1
2018/0049250 A1* 2/2018 Perng ................... H04W 76/10

2018/0108104 A1* 4/2018 Keen .................. G06Q 30/0207
2019/0261225 A1   8/2019 Eswarakava et al.
2019/0356741 A1* 11/2019 Watson ................. H04L 67/125
                                (Continued)

FOREIGN PATENT DOCUMENTS

EP          4380201 A1     6/2024

OTHER PUBLICATIONS

Extended European Search Report from European Patent Application No. 23212998.2 dated Apr. 17, 2024.

*Primary Examiner* — Christopher B Robinson
*Assistant Examiner* — Chong G Kim
(74) *Attorney, Agent, or Firm* — Perkins Coie LLP

(57)     ABSTRACT

Embodiments described herein relate to managing wireless connections within a spatially-dense setting like a passenger vehicle, thereby improving quality and reliability of individual wireless connections. An example method includes detecting a connection request from a passenger device requesting a wireless connection with a seatback device in a first in-vehicle location. The method includes defining a density zone that includes other in-vehicle locations surrounding the first in-vehicle location. The density zone localizes an area within which other wireless connections may be disruptive to the wireless connection. The method includes determining, via a token server that stores connection tokens that each describe an existing connection, a number of particular tokens that describe existing connections located within the density zone. The method includes selectively granting or denying the requested wireless connection by comparing the number of particular tokens with a maximum number of connections or a capacity for the density zone.

19 Claims, 6 Drawing Sheets

(56) References Cited

U.S. PATENT DOCUMENTS

| 2020/0120733 | A1* | 4/2020 | Winston | ............ | H04W 72/0453 |
| 2020/0213849 | A1* | 7/2020 | Zhao | .................... | H04W 12/08 |

* cited by examiner

IN-VEHICLE CONTROL OF WIRELESS CONNECTION DENSITY

BACKGROUND

Commercial travel has evolved to provide an informative and interactive experience to passengers traveling to their destinations. Via in-vehicle systems, entertainment options and useful information can be curated and presented to passengers via monitors located on the back of airplane seats or train seats, for example. As an alternative to monitors installed within the vehicle, passengers commonly own and use user devices that are capable of presenting content to the passengers. A need exists for reliable and efficient communication between the user devices and in-vehicle systems.

SUMMARY

The present document provides various techniques for managing wireless connections between user devices (also referred to herein as passenger devices) and an in-vehicle system that provides content and information to passengers in a vehicle. In particular, various techniques and embodiments described herein enable high-resolution and dynamic management of wireless connection density throughout a vehicle, thereby preventing cross-interference and improving reliability of passenger device usage within a vehicle. For example, embodiments disclosed in the present document address technical challenges related to signal interference that arises when multiple densely-arranged passengers within a vehicle wirelessly connect their user devices with in-vehicle systems and monitors.

To provide solutions to these technical challenges, various embodiments involve the use of tokens or data objects that represent existing wireless connections between user devices and monitors or stations at mapped locations (e.g., within the vehicle). A connection management system for a vehicle uses such tokens to determine whether to grant or deny a new connection request from a user device at a given location. In this determination, the connection management system defines a density zone or area around the given location and determines whether the connections indicated by the tokens within the density zone exceeds a capacity or threshold. Through dynamic creation, modification, and deletion of the tokens, the connection management system is able to assess a current landscape and spatial density of wireless connections and perform connection management operations thereby.

In one example aspect, a method is disclosed. The method includes detecting a connection request from a first passenger device requesting a wireless connection with a first seatback device at a first in-vehicle location within a vehicle having a plurality of seatback devices located at a plurality of in-vehicle locations. The method further includes defining a first density zone that includes one or more other in-vehicle locations surrounding the first in-vehicle location according to zone configuration data that indicates a zone size for the first density zone. The zone configuration data further indicates a maximum number of wireless connections allowed for the first density zone. A token server stores connection tokens that each describe an existing wireless connection, and the method further includes determining, via the token server, a number of particular connection tokens that describe existing connections at the one or more other in-vehicle locations within the first density zone. The method further includes selectively denying the wireless connection between the first passenger device and the first seatback device by comparing the number of particular connection tokens with the maximum number of wireless connections allowed for the first density zone.

In another example aspect, an in-vehicle system within a vehicle is disclosed. The in-vehicle system includes a device interface via which the in-vehicle system communicates with a plurality of seatback devices located at a plurality of in-vehicle locations throughout the vehicle to (i) detect a connection request by a passenger device with a seatback device, and (ii) cause a wireless connection between the passenger device and the seatback device to be permitted or denied. The in-vehicle system includes a token server that stores connections tokens that describe existing wireless connections and indicate in-vehicle locations of respective seatback devices of the existing wireless connections. The in-vehicle system includes a connection management module that references the token server to selectively determine whether to permit or to deny the wireless connection between the passenger device and the seatback device based on a number of particular connection tokens that indicate particular in-vehicle locations within a density zone that includes an in-vehicle location of the seatback device.

In yet another aspect, a connection management system is disclosed. The connection management system includes a processor and a memory storing instructions that, when executed by the processor, cause the connection management system to detect a connection request from a first passenger device requesting a wireless connection with a first seatback device at a first in-vehicle location within a vehicle. The instructions further cause the connection management system to define a first density zone that includes one or more other in-vehicle locations surrounding the first in-vehicle location according to zone configuration data that indicates a zone size for the first density zone. The zone configuration data further indicates a maximum number of wireless connections for the first density zone. The instructions further cause the connection management system to determine, via a token server that stores connection tokens that each describe an existing wireless connection, a number of particular connection tokens that describe existing wireless connections at the one or more other in-vehicle locations within the first density zone. The instructions further cause the connection management system to transmit, to the first seatback device, one of a first instruction to disconnect the wireless connection or a second instruction that permits the wireless connection. The first instruction is transmitted based on the number of particular connection tokens being less than the maximum number of wireless connections, and the second instruction is transmitted based on the number of particular connection tokens being at least the maximum number of wireless connections.

In yet another aspect, a computer readable medium is disclosed. The computer readable medium stores processor-executable program code that, upon execution by one or more processors, causes implementation of one or more methods described in the present document.

These, and other aspects are disclosed throughout the present document.

DETAILED DESCRIPTION

Figure 1:
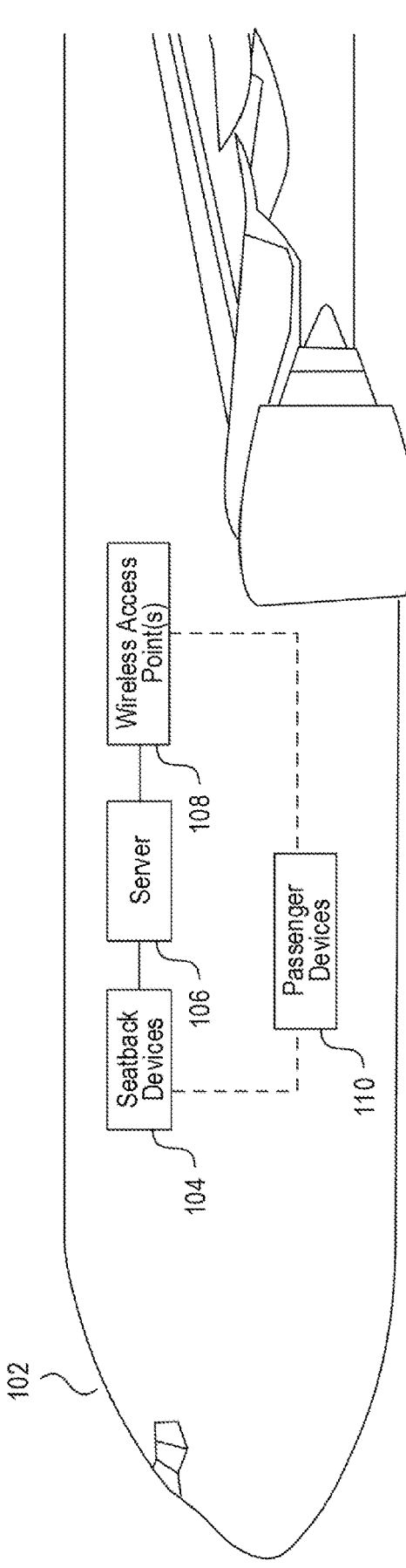
FIG. 1 shows an exemplary passenger vehicle that includes an in-flight entertainment and communication (IFEC) installation, in accordance with embodiments described herein.

Among the many advancements in travel technology and aircraft technology, improvements in passenger experience have received much attention. Air travel typically involves journeys over extended distances that at the very least take several hours to complete, so airlines provide onboard in-flight entertainment (IFE) and communications (IFEC) systems that offer a wide variety of multimedia content for passenger consumption. For example, IFEC systems may offer recently released movies and television shows such as news programs, situation and stand-up comedies, documentaries, and so on for passenger viewing. As another example, IFEC systems may offer audio-only programming, video-only content, video games, or the like. As yet another example, the multimedia content provided to passengers includes flight maps, passenger account information, flight itinerary information, flight tracking information, and/or other useful and/or passenger-specific information.

Vehicles includes installations, monitors, stations, and/or the like within the vehicle that presents such content to passengers. For example, each passenger seat is equipped with a seatback device that includes a display device, an audio output modality, an input modality, and a terminal unit (although the specific installation may vary depending on service class, in specific embodiments). The terminal unit may generate video and audio signals, receive inputs from the input modality, and execute pre-programmed instructions in response thereto. The display device may be a liquid crystal display (LCD) screen that is installed on the seatback of the row in front of the passenger, though in some cases it may be mounted to a bulkhead or retractable arm, or the like, that is in turn mounted to the passenger's seat. In some examples, the audio output modality is a headphone jack, to which a headphone, either supplied by the airline or by the passenger, may be connected. In some examples, the audio output modality enables wireless connection with passenger devices, such as personal audio playback devices (e.g., headphones, earphones, earbuds, speakers, etc.). Inputs to the terminal unit may be provided via a separate multi-function remote controller or by via a combination touch display. Although the terminal unit and display device were separate components in earlier IFEC implementations, more recently, these components and more may be integrated into a single smart monitor or seatback device. Thus, the vehicle is integrated with a plurality of monitors that present content to passengers.

Passengers of a vehicle commonly own and use personal electronic devices (also referred to herein as user devices and passenger devices) that are used by the passengers to consume content and information, whether within the vehicle travel context or otherwise. For example, passengers bring aboard personal devices, such as laptops, mobile phones, and tablets, for use during travel. According to advancements in vehicle technology, personal electronic devices of passengers are leveraged when presenting content and information to passengers within a vehicle. Individual seatback devices are configured with wireless connection capabilities for wirelessly connecting with personal electronic devices of passengers, such that the content and information is relayed to and presented at the personal electronic devices.

In providing this functionality, technical problems arise. Reliability and quality of wireless connections declines in scenarios in which a spatial density of wireless connections is high. In particular, signal interference occurs between wireless connections that are near one another. This problem arises in commercial aircraft and other vehicles in which passengers and in-vehicle devices are arranged in close proximity to one another. As a result, wireless signals transmitted between one pair of passenger device and seatback device are interfered with and disrupted by other wireless signals transmitted between nearby pairs of passenger device and seatback device. Outside of in-vehicle settings, these technical problems arise in travel hubs (e.g., an airport, a train station) and other areas with a plurality of devices to which the personal electronic devices can connect.

Embodiments disclosed herein address these technical problems by controlling a spatial density of wireless connections. In particular, wireless connections are dynamically granted or denied based on existing wireless connections that are located nearby and expected to be interfering or disruptive. According to example embodiments, connection tokens are dynamically created and managed to represent current wireless connections throughout an area, with each connection token corresponds to a wireless connection at a particular location. Then, when determining whether to grant or deny a given wireless connection at a given location, the connection tokens are referenced to easily determine whether too many wireless connections already exist nearby. Based on the connection tokens, the given wireless connection is granted or denied.

Embodiments disclosed herein provide density zones that precisely define the nearby and relevant locations for a given wireless connection. According to example embodiments, a density zone is defined around a location for the given wireless connection, and the density zone represents a spatial unit or area within which a given number of other wireless connections may negatively affect the given wireless connection. For example, in an aircraft setting, a density zone includes a number of rows and a number of columns of seats that surround a particular seat at which a connection is being requested. As another example, a density zone is defined as a cabin or section of the vehicle in which a connection is being requested. The given number of other wireless connections for a density zone is defined as a capacity or threshold (e.g., defined as a token capacity, a connection capacity, a cumulative connection power threshold, and/or the like), and a number of tokens corresponding to locations within the density zone is compared against this capacity or threshold to determine whether the density zone can handle additional more wireless connections.

Thus, embodiments disclosed herein provide efficient and accurate techniques for managing wireless connections based on nearby existing wireless connections represented by connection tokens. Technical improvements result from the disclosed embodiments, as a quality and a reliability of individual wireless connections is improved without excess amounts of interfering or disruptive connections located nearby. Through the use of tokens that represent current wireless connections and density zones that define relevant locations, intelligent decisions on whether to grant or deny a given wireless connection are made, and by doing so, occurrences of poor device connections and negative passenger experiences are reduced.

FIG. 1 shows an exemplary overview of an IFE system installed in an airplane 102, and example embodiments for managing a density of wireless connections are implemented for the IFE system and the airplane 102. The IFE system includes a plurality of seatback devices 104, and the seatback devices 104 are located at locations within the vehicle. For example, the seatback devices 104 are located at each seat of the airplane 102, which are laid out in a fixed grid or layout of seat rows and seat columns. In some embodiments, the seatback devices 104 include an in-device terminal or computing unit. In some embodiments, the seatback devices 104 are communicably coupled to computing units (e.g., computers) that may be located in a seat below one or more seatback devices 104. For example, one or more seatback devices 104 located in a row in the airplane 102 may be communicable coupled to one computing unit located below a seat in the row. In another example, each seatback device 104 may be communicably coupled to a respective computing unit that is located in the seat where the seatback device 104 is located.

In some embodiments, each of the plurality of seatback devices 104 is configured such that a passenger device 110 can directly connect with a seatback device 104 (or a computing unit to which the seatback device 104 is coupled). For example, each seatback device 104 is configured for Bluetooth or Bluetooth Low Energy (BLE) communication with passenger devices 110. Accordingly, a seatback device 104 is configured to detect nearby candidate passenger devices, receive connection requests from passenger devices 110, establish a direct connection or pairing with a passenger device 110, and transmit/receive data via the direct connection or pairing with the passenger device 110. In some examples, a seatback device 104 is configured for direct communication with passenger devices 110 via other means, such as a near-field communication (NFC) device via which a passenger device 110 directly communicates with the seatback device 104. As the seatback device 104 connects with a nearby passenger device 110, the in-vehicle location of the seatback device 104 approximately represents a location of the wireless connection.

Each of the plurality of seatback devices 104 (or computing units to which the seatback devices 104 are coupled) may include an ethernet connector which allows the plurality of seatback devices 104 to be communicably coupled to a server 106 via, for example, an Ethernet switch. In some embodiments, a seatback device 104 reports connection requests from passenger devices, connection and disconnection events, device information, and/or the like to the server 106. In some embodiments, the server 106 includes one or more processing units configured to implement example operations disclosed herein to determine whether to grant or deny a wireless connection between a seatback device 104 and a passenger device based on nearby tokens.

Thus, in some embodiments, the server 106 implements a connection management system and is configured to transmit instructions or commands to individual seatback devices that cause the individual seatback devices to continue or disconnect respective wireless connections. In performing example operations disclosed herein, the server 106 includes or communicates with a token server at which connection tokens are dynamically created and managed, such that the server 106 is able to reference the connection tokens to ascertain a density of wireless connections in a given area.

In some embodiments, passenger devices 110 directly connect to seatback devices 104 via Bluetooth. In some embodiments, the server 106 instructs and grants permission to seatback devices 104 to accept or deny Bluetooth connection requests. In some other embodiments, the server 106 is communicably coupled (e.g., via Ethernet switch) to one or more wireless access points 108, and passenger devices 110 can connect to the server 106 and/or seatback devices via the wireless access points 108 (e.g., via Wi-Fi connections). That is, in one example embodiment, a passenger device 110 can connect to a seatback device 104 indirectly via a wireless access point 108. In some embodiments, the airplane 102 includes a plurality of wireless access points 108 in in-vehicle locations, and a number of passenger devices 110 connected to a wireless access point 108 is controlled in accordance with embodiments described herein.

While FIG. 1 illustrates an example of an aircraft, embodiments disclosed herein for controlling wireless connections throughout various locations are applicable to other vehicles. For example, embodiments disclosed herein enable a system to be implemented on a train to control wireless connections between passenger devices and individual stations (e.g., seatback devices, tablets, kiosks) on the train. Further, embodiments disclosed herein are applicable to systems at travel hubs. For example, embodiments disclosed herein enable a system implemented at an airport lounge to determine whether to grant or deny wireless connections with a lounge device or system (e.g., a mounted screen, a television, a tablet, individual seat devices) by passenger or user devices.

Figure 2:
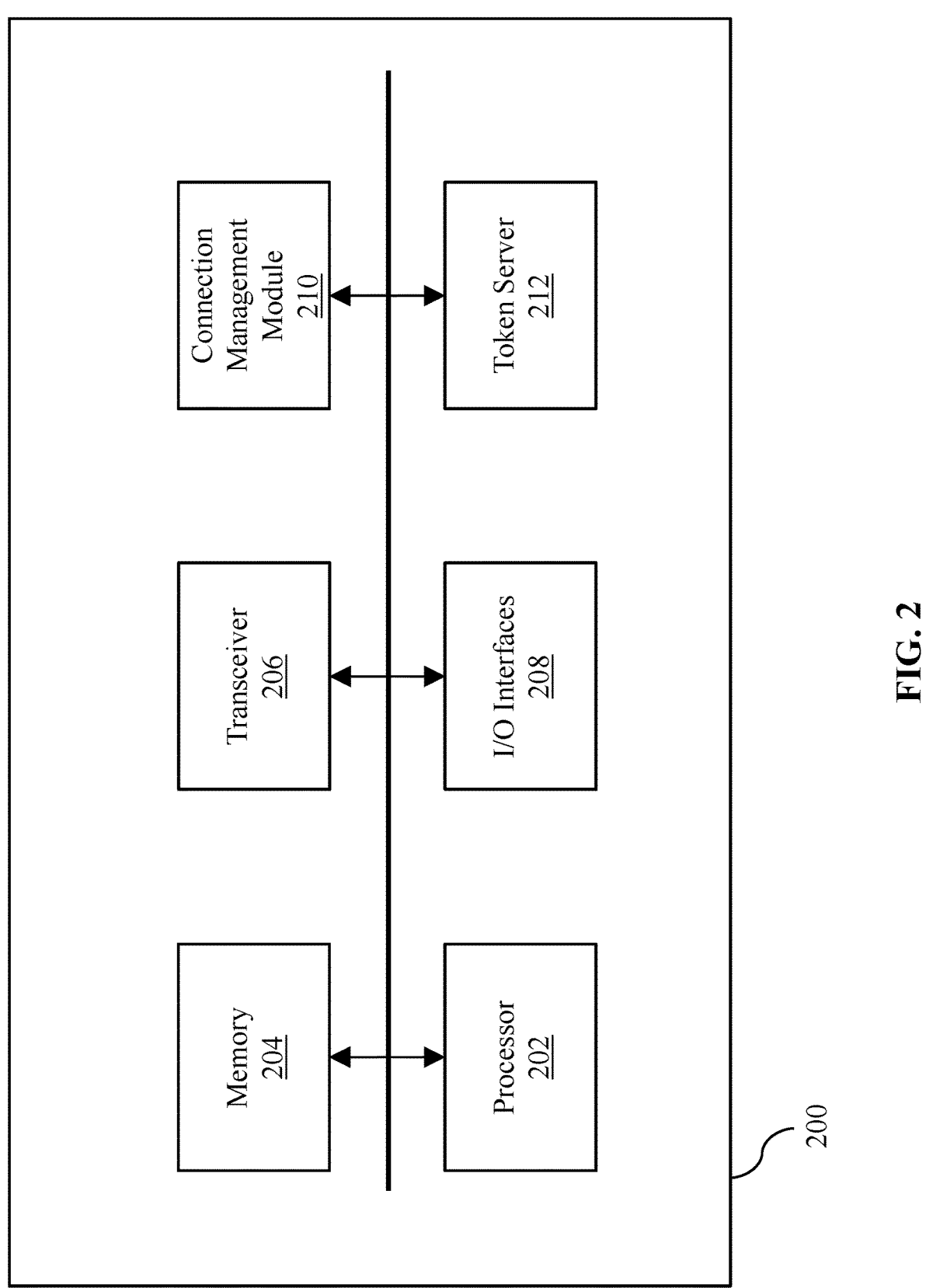
FIG. 2 is a block diagram of a device on which embodiments described herein may be implemented.

FIG. 2 provides a diagram illustrating an example computing entity 200 that implements various embodiments described herein. In some embodiments, the computing entity 200 is located within a vehicle. For example, in some embodiments, the computing entity 200 is configured to perform operations that relate to granting or denying wireless connections based on referencing dynamically stored and managed connection tokens. In some embodiments, the computing entity 200 is embodied by an entertainment system (IFEC system), an in-vehicle server (e.g., server 106), a connection management system, and/or the like.

In FIG. 2, the computing entity 200 includes at least one processor 202 and a memory 204 having instructions stored thereupon. The memory 204 may store instructions to be executed by the processor 202. In other embodiments, additional, fewer, and/or different elements may be used to configure the computing entity 200. The memory 204 is an electronic holding place or storage for information or instructions so that the information or instructions can be accessed by the processor 202. The memory 204 can include, but is not limited to, any type of random access memory (RAM), any type of read only memory (ROM), any type of flash memory, etc. Such as magnetic storage devices (e.g., hard disk, floppy disk, magnetic strips, etc.), optical disks (e.g., compact disk (CD), digital versatile discs (DVD), etc.), smart cards, flash memory devices, etc. The instructions upon execution by the processor 202 configure the computing entity 200 to perform the example operations described in this patent document.

The instructions executed by the processor 202 may be carried out by a special purpose computer, logic circuits, or hardware circuits. The processor 202 may be implemented in hardware, firmware, software, or any combination thereof. The term "execution" is, for example, the process of running an application or the carrying out of the operation called for by an instruction. The instructions may be written using one or more programming language, scripting language, assembly language, etc. By executing the instruction, the processor 202 can perform the operations called for by that instruction. The processor 202 operably couples with the memory 204 and transceiver 206 to receive, to send, and to process information and to control the operations of the computing entity 200. The processor 202 may retrieve a set of instructions from a permanent memory device such as a ROM device and copy the instructions in an executable form to a temporary memory device that is generally some form of RAM. In some implementations, the computing entity 200 can include a plurality of processors that use the same or a different processing technology.

The transceiver 206 transmits and receives information or data to another device (e.g., a seatback device 104, a passenger device 110, a ground server, other servers, satellites, or the like). In some examples, the transceiver 206 transmits instructions that grant a wireless connection or instructions that deny a wireless connection to a seatback device 104. In some examples, the transceiver 206 is configured to relay event information (e.g., describing a number of connection grants or denials, describing a number of wireless connections, describing analytics related to wireless connections) to a ground server that is used to refine and improve information used to define density zones. In some examples, the transceiver 206 is configured to receive zone configuration data from a ground server, from other aircraft, from satellites, and/or the like that includes parameters for density zones defined by the computing entity 200. The transceiver 206 may be comprised of a transmitter and a receiver; in some embodiments, the computing entity 200 comprises a transmitter and a receiver that are separate from another but functionally form a transceiver.

In some embodiments, the computing entity 200 includes input/output (I/O) interfaces 208. The I/O interfaces 208 enable data to be provided to the computing entity 200 as input and enable the computing entity 200 to provide data as output. For example, the computing entity 200 provides a visualization of a defined density zone surrounding a given in-vehicle location via the I/O interfaces 208. As another example, the computing entity 200 provides a control display for a user to manually grant or deny a new wireless connection based on a display of existing wireless connections nearby. In some embodiments, the I/O interfaces 208 may enable user input to be obtained and received by the computing entity 200 (e.g., via a touch-screen display, via buttons or switches) and may enable the computing entity 200 to display information. In some embodiments, devices including touch-screen displays, buttons, controllers, audio speakers, or the like are connected to the computing entity 200 via I/O interfaces 208. In some embodiments, the I/O interfaces 208 include a device interface via which the computing entity 200 communicates with seatback devices 104. The device interface enables the computing entity 200 to receive information from seatback devices 104 and to transmit instructions to specific seatback devices 104.

As shown in FIG. 2, the computing entity 200 further includes a connection management module 210. In some embodiments, the connection management module 210 is embodied by a combination of at least a portion of the processor 202 and the memory 204. In some embodiments, the connection management module 210 includes a dedicated processor and a dedicated memory. In some embodiments, the connection management module 210 is a computing device that is included in or connected to the computing entity 200. The connection management module 210 is configured to perform example operations disclosed herein for controlling or managing a density of wireless connections, for example, within a vehicle.

According to example embodiments, the connection management module 210 is configured to dynamically manage connection tokens and to determine whether to grant or deny wireless connection using the connection tokens. In particular, the connection management module 210 is configured to perform token management operations, and the connection management module 210 is configured to perform zone definition and evaluation operations, in some embodiments.

In some embodiments, the computing entity 200 includes a token server 212 at which the connection tokens managed by the connection management module 210 are stored. In some embodiments, the token server 212 is a portion of the memory 204. In some embodiments, the token server 212 is an individual memory device integrated or coupled with the computing entity 200. In some embodiments, the connection management module 210 implements the token server 212 at which the connection management module 210 is configured to dynamically create, modify, and release connection tokens that describe and represent wireless connections within a vehicle. The connection management module 210 is configured to dynamically create connection tokens for new and/or granted wireless connections, modify connection tokens to renew the tokens and respective connections, and release connection tokens that are "stale" or whose respective wireless connections no longer exist.

In some embodiments, the connection management module 210 is configured to generate connection tokens that include a token identifier, a location identifier (e.g., a seat number), and/or other information describing the respective wireless connection. In some embodiments, the token identifier enables the connection management module 210 to reference specific connection tokens when parsing a seat status table or seat map. For example, a list of seats includes a token identifier column or parameter that indicates, if any, a token corresponding to or assigned to a given seat according to the token identifier In some embodiments, the connection management module 210 is configured to include passenger and/or passenger device information in a token when creating the token. For example, for a given wireless connection involving a passenger device of a passenger, the connection management module 210 is configured to store or access profile data for the passenger that indicates one or more demographic categories (e.g., account status, travel experience, age) that is included in a token. In doing so, the tokens provide multi-dimensional information that enable more dynamic control over wireless connection across passengers. For example, a number of allowed wireless connections can be differentially configured by account status of passengers based on including passenger account status in the tokens. Similarly, the connection management module 210 is configured to obtain a device type, device address, and/or the like of the passenger device of a wireless connection, and include such device parameters in a connection token. Then, for example, wireless connections for laptops can be controlled separately for wireless connections for mobile phones. In some embodiments, the connection management module 210 is configured to include parameters relating to the wireless connection itself in the token. For example, a token indicates a signal or connection quality of the respective wireless connection, transmit powers, and/or other parameters.

As discussed, the connection management module 210 is configured to perform various operations with the token server 212 to dynamically manage connection tokens, and in some embodiments, these operations include creating a token, modifying a token, and releasing a token. In some embodiments, the connection management module 210 creates, generates, acquires, activates, and/or the like a connection token in response to a seatback device connecting with a user device. In some examples in which seatback devices connect with user devices over Bluetooth, the connection management module 210 creates a connection token for a Bluetooth connection but not for a Bluetooth pairing. In various examples, the connection between the seatback device and the user device is initiated by any one of the seatback device or the user device and can occur after a reboot of either device or Bluetooth functionality being toggled on at either device.

In some embodiments, the connection management module 210 is configured to modify tokens to renew tokens. Connection tokens are associated with an expiration time, such that the tokens dynamically represent current wireless connections in real-time. Upon reaching the expiration time, the connection management module 210 is configured to renew the token with a new expiration time based on the respective wireless connection still existing, being active, or being in use. In some embodiments, the connection management module 210 is configured to release tokens such that the absence of a wireless connection is accurately reflected by the tokens. Release of tokens is caused by the expiration times of each token and/or by a reboot or fault at the seatback device that is detected by the connection management module 210.

In some embodiments, the connection management module 210 is configured to implement an application programming interface (API) via which the seatback devices interface with the connection management module 210 to cause the token management operations to be performed. In an example, a seatback device transmits an API request to the connection management module 210 for a new token in response to a connection request occurring at the seatback device. In response to receiving the API request and according to zone evaluations described herein, the connection management module 210 updates the token server 212 with a new token or by marking an existing token as active or in use based on the connection management module 210 granting the connection request, and the new token or marked token is assigned with an expiration time. The connection management module 210 then provides an API response that indicates a token identifier of the new or marked token as well as the expiration time.

In an example, the seatback device transmits an API request to the connection management module 210 to renew the token for the seatback device. The seatback device transmits this API request based on the seatback device remaining in wireless connection with the user device at the expiration time. In some embodiments, the seatback devices individually and locally monitor the expiration time and provide indications to the connection management module 210 of whether to renew the token. In response to the API request, the connection management module 210 updates the expiration time for the token and provides an API response with the same token identifier and the updated expiration time. In an example, the seatback device transmits an API request to the connection management module 210 to release the token based on the wireless connection no longer existing. The connection management module 210 accordingly releases (e.g., deletes) the token or marks the token as inactive/unused, and provides an API response that acknowledges the request. In an example, the seatback device transmits an API request or message to the connection management module 210 that indicates that a reboot of the seatback device. In response to the API request or message, the connection management module 210 releases the token or marks the token as inactive/unused.

In some embodiments, the connection management module 210 and/or the token server 212 implement a seat status table that includes mappings between token identifiers and seat or location identifiers. For example, the seat status table includes a list of locations (e.g., seats) where seatback devices are located, and each location corresponds to a token is that is either marked as active/used or inactive/unused by the connection management module 210. In another example, the seat status table includes a list of locations, and each location is assigned with a token based on the dynamic token operations performed by the connection management module 210.

With respect to the zone definition and evaluation operations, the connection management module 210 is configured to define density zones for connection requests to determine whether to grant or deny the connection requests. By defining density zones, the connection management module 210 localizes a connection request and is able to determine whether too many wireless connections already exist in the local area within the vehicle.

In some embodiments, the connection management module 210 is configured to obtain zone configuration data that includes parameters for how to define density zones. For example, zone configuration data includes a size (e.g., with respect to distance measurements, with respect to a number of seats or locations) of a density zone, a centering of a density zone (e.g., centered on a connection request, skewed around the connection request), and/or the like. In some embodiments, the zone configuration data includes different zone parameters for density zones in different sections of the vehicle. For example, given an aircraft with a first class cabin and a business class cabin, the zone configuration data includes different sizes for density zones per cabin. In some embodiments, the connection management module 210 obtains the zone configuration data from a ground server and/or from other vehicles, and the zone configuration data is generated based on connection testing. For example, the zone configuration data is generated based on experimental testing that determines relative distances between different wireless connections that interfere or disrupt one another.

Thus, according to zone configuration data, the connection management module 210 is configured to define a density zone surrounding a connection request and use the locations within the density zone to reference the token server 212. In particular, the density zone includes a plurality of locations, and in various examples, the locations includes particular locations being indicated by connection tokens stored in the token server 212. As such, the connection management module 210 is configured to, given the density zone, reference the token server 212 to identify tokens that correspond to locations within the density zone.

In some embodiments, the connection management module 210 compares the identified tokens that correspond to locations within the density zone to a capacity for the density zone. In some embodiments, the capacity defines one or more thresholds for the density zone by which a new wireless connections are granted or denied. In an example, the capacity includes a threshold or maximum number of connections (or tokens) that are allowed to be present in the density zone, or that are allocated for the density zone. In an example, the capacity includes a threshold for cumulative transmit power of wireless connections within the density zone. In an example, the capacity includes a maximum number of tokens allocated for passengers of a particular demographic category. Thus, in some embodiments, the capacity includes thresholds defined with respect to information included to the tokens.

In some embodiments, the connection management module 210 is further configured to record or generate event data relating to wireless connections between passenger devices and in-vehicle devices (e.g., seatback devices 104). In some embodiments, the connection management module 210 is configured to generate an event data for a token creation event, a token renewal event, and a token release event. In doing so, the event data indicates a number of times that wireless connections are granted (e.g., token creation events), an average length of time that wireless connections are active (e.g., based on a number of token renewal events per token), and other insights obtained from token management. In some embodiments, the connection management module 210 is configured to generate event data that includes a list of unique tokens created during a flight or trip of the vehicle. As with the tokens, the event data further indicates a location identifier (e.g., a seat number) associated with each wireless connection or token that is described, in some embodiments. In some embodiments, the connection management module 210 is configured to generate event data that includes, for a given wireless connection (e.g., indicated by a given connection token), at least one of: a passenger device type, a passenger device ID (e.g., a MAC address), services or Bluetooth profiles used, timestamp(s) when the connection was established (e.g., when token was created) and renewed, a location of the given wireless connection (e.g., a seat number), a length of time that the given wireless connection was active, a number of times the connection was renewed, content identifiers for content provided via the given wireless connection (e.g., song identifiers, movie identifiers, content identifiers), and/or the like.

In some embodiments, the connection management module 210 is configured to store the event data in memory 204 while the vehicle is in flight, and the connection management module 210 is configured to cause the event data to be transmitted to a ground server (e.g., via transceiver 206) after the flight of the vehicle. In some embodiments, the connection management module 210 is configured to cause the event data to be transmitted to other vehicles during the flight of the vehicle.

By sharing the event data, improvements to connection management can be made. First, for example, improvements with respect to token management include modifying renewal time periods for tokens based on a number of times connections are renewed, based on a number of connection denial events, and/or the like. In doing so, a number of dynamic token management operations that are performed is reduced, without significantly affecting the accuracy of representing existing wireless connections by the connection tokens. Second, improvements with respect to zone management and evaluation include modifying zone configuration data. For example, given that event data indicates an excess number of connection denial events, zone configuration data may be modified to increase a threshold of density zones, modify a size of density zones, and/or the like. As another example, given that event data indicates a disproportional number of connection requests in a first section of a vehicle compared to a second zone, density zone size and/or capacity for the second zone can be increased.

In some embodiments, the computing entity 200, one or more ground servers, and/or the connection management module 210 are configured to implement a machine learning model for modifying parameters for token management and zone definition and evaluation. In some embodiments, the machine learning model is trained to receive the event data as input and output a predicted and/or optimized density zone size, density zone capacity, a token renewal time, and/or the like. Accordingly, in an example, the connection management module 210 obtains zone configuration data to use for a first flight to define and evaluate density zones, provides event data for the first flight to ground servers, and receives improved zone configuration data to use for a second flight.

Figure 3:
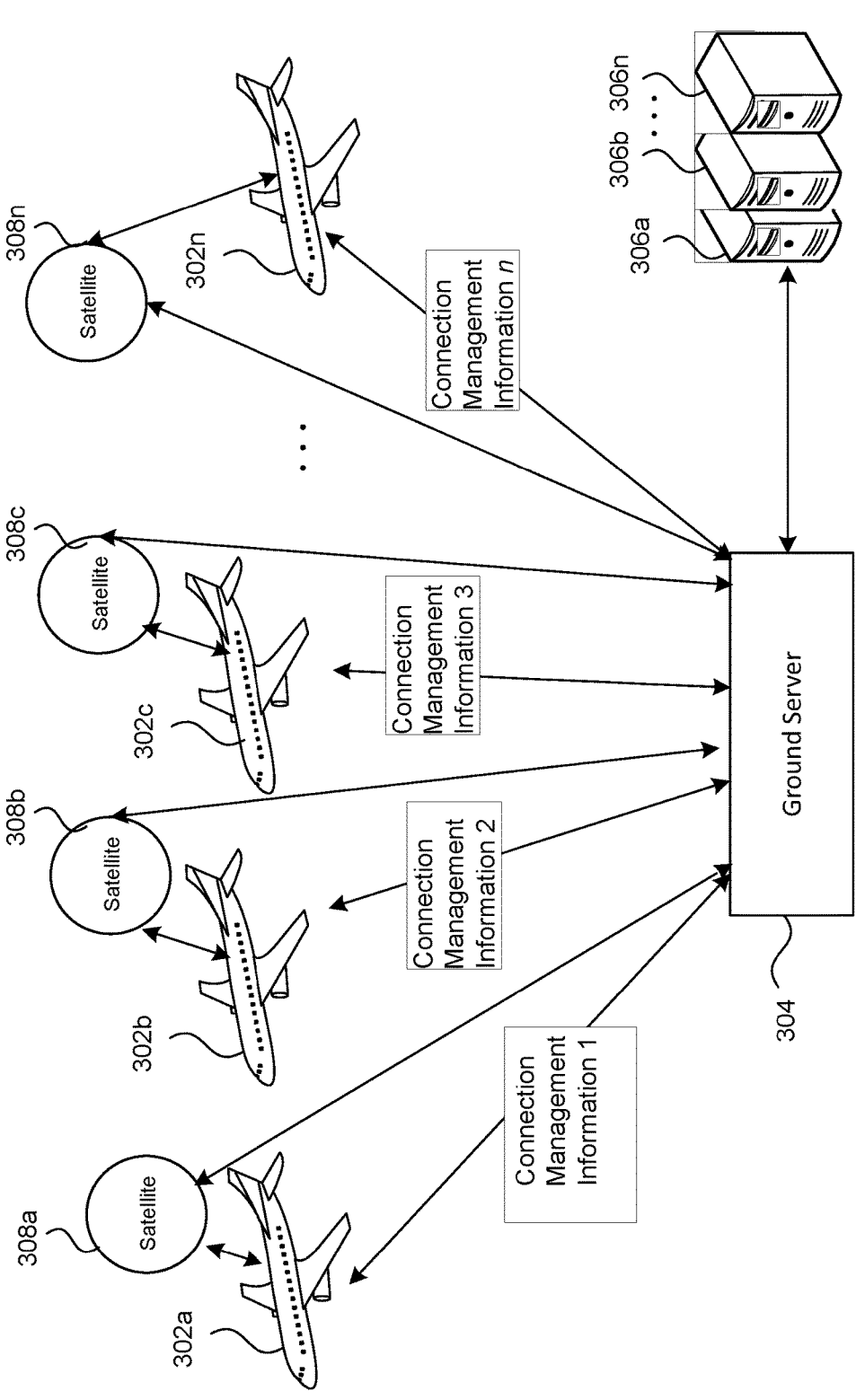
FIG. 3 shows a vehicle network with vehicles that implement technical solutions for managing in-vehicle density of wireless connections, in accordance with embodiments described herein.

FIG. 3 shows an exemplary system for data gathering, processing, and usage. In particular, FIG. 3 shows a communication network in which information obtained from and used for managing wireless connections in a vehicle is communicated to, from, and among vehicles and other systems. For example, in accordance with various embodiments described herein, a communication management system located on-board an airplane obtains zone configuration data that provides parameters for density zones defined by the communication management system for managing a given wireless connection. According to FIG. 3, the zone configuration data may be obtained at one airplane from other airplanes and/or from a ground server 304. As another example, the communication management system generates event data that describes connection denials, connection grants, connection renewals, and/or the like, and the event data is shared with other airplanes and/or the ground server 304. As yet another example, an airplane obtains seat map or location information from the ground server 304 that is specific to a type or class of airplanes.

A ground server 304 is configured to communicate with vehicles 302a, 302b, . . . 302n via a direct communication link or through a satellite connection using satellites 308a, 308b, 308c, . . . 308n, in some embodiments. In some embodiments, databases 306a, 306b, . . . 306n may include databases that store the zone configuration data, databases that store event data, databases that store device location maps, and/or the like. In some embodiments, the ground server 304 communicates with each of the databases 306a, 306b, . . . 306n to provide one or more of the zone configuration data, event data, or seat map data to the vehicles 302a, 302b, . . . , 302n.

In some embodiments, the data gathering, processing and usage network depicted in FIG. 3 may include equipment that provides wireless communication connectivity between the airplane equipment and ground based server via equipment such as a Wi-Fi access points at an airport gate, or via a cellular communication equipment such as a cell phone tower that may be available to the airplane at the airport or near gate area. In some examples, the Wi-Fi and cellular connectivity may also be available to some airplanes during flight; for example, some airplanes may maintain connectivity with the ground server 304 (e.g., via satellites 308) while in flight such that data is obtained from the ground server 304 at any time while the airplanes are in flight.

Figure 4:
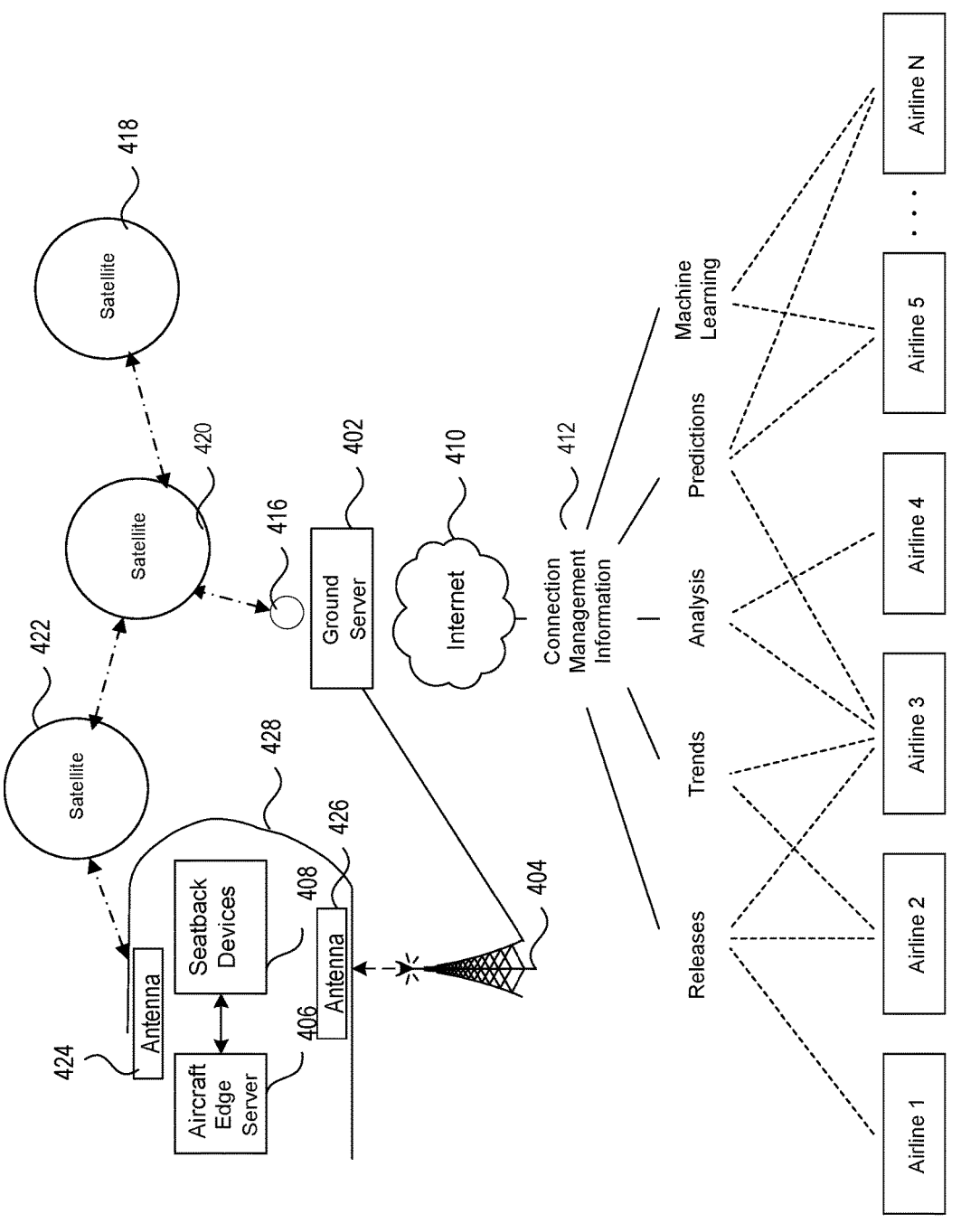
FIG. 4 shows an example of a network architecture for a vehicle that implements technical solutions for managing in-vehicle density of wireless connections, in accordance with embodiments described herein.

FIG. 4 shows another configuration of a system in which a ground server 402 may use information from multiple airlines (Airline 1, Airline 2 . . . Airline N) to provide connection management information to an aircraft 428. For example, as illustrated, the ground server 402 communicates with multiple airlines to aggregate, analyze, and learn from event data collected by airlines to generate improved zone configuration data. Thus, in some embodiments, improved zone configuration data is generated and stored at the ground server 402, possibly via communication through the internet 410, in some embodiments.

The ground server 402 may communicate the information via a satellite dish 416 with one or more satellites 418, 420, 422, and the information is in turn received in the aircraft 428 via antenna 424 by an onboard server 406, or edge server. The onboard server 406 may implement various embodiments described herein, to manage wireless connections between user devices and seatback devices 408 onboard the aircraft 428. Alternatively, or in addition, the ground server 402 may communicate the information to the onboard server 406 through a terrestrial connection such as through cellular communication via a cellular network to an antenna 426 onboard the airplane that is configured for cellular reception. In some embodiments, the connectivity between the ground server 402 and airplane equipment may be based on a local area wireless network (e.g., a Wi-Fi access point) or a cellular communication network (e.g., cell tower 404) which may be available to the aircraft 428 for communication while during a flight or when parked at an airport terminal, near the gate area.

As illustrated in FIG. 4, the onboard server 406 may be in communication with one or more seatback devices 408. The onboard server 406 may communicate instructions to establish a wireless connection with a user device, maintain a wireless connection with a user device, or disconnect a wireless connection with a user device. To determine such instructions, the onboard server 406 receives reports from seatback devices 408 that indicate connection requests from user devices. The onboard server 412 may be connected with the seatback devices 408 via wireless connection or via wired connections.

In some embodiments, the onboard server 406 may be implemented in the form of one or more hardware platforms that include one or more processors, one or more computer memories and network interface for digital data communications. For example, the onboard server may embody the computing entity 200. The onboard server may be configured to provide various instructions and content to the seatback devices 408. The onboard server may also be configured to communicate with a ground server or another server across the internet or a computing cloud for exchanging information related to account data for passengers, unique identifiers for passenger devices, and so on. The onboard server may perform such communication in real-time (e.g., using the example satellite communication paths depicted in FIGS. 3 and 4) or offline such as communicating with the ground sever at the beginning and/or end of a travel segment.

Similar to the server systems onboard the aircraft described above, the ground server is understood to be a standalone computer system, or multiple standalone computer systems with general purpose data processors, memory, secondary storage, and/or a network interface device for connecting to each other. The computer systems may have an operating system installed thereon, along with the server applications that implement the various components of the system for sensor data collection and processing according to the embodiments disclosed herein. The ground server may access zone configuration data from one or more databases and transmit the zone configuration data to vehicles. In some embodiments, the ground server implements machine learning models to improve, optimize and predict zone configuration data using event data received from vehicles. In some embodiments, the ground server and the onboard server synchronize zone configuration data and event data after the airplane lands and establishes a connection with the ground server.

Figure 5:
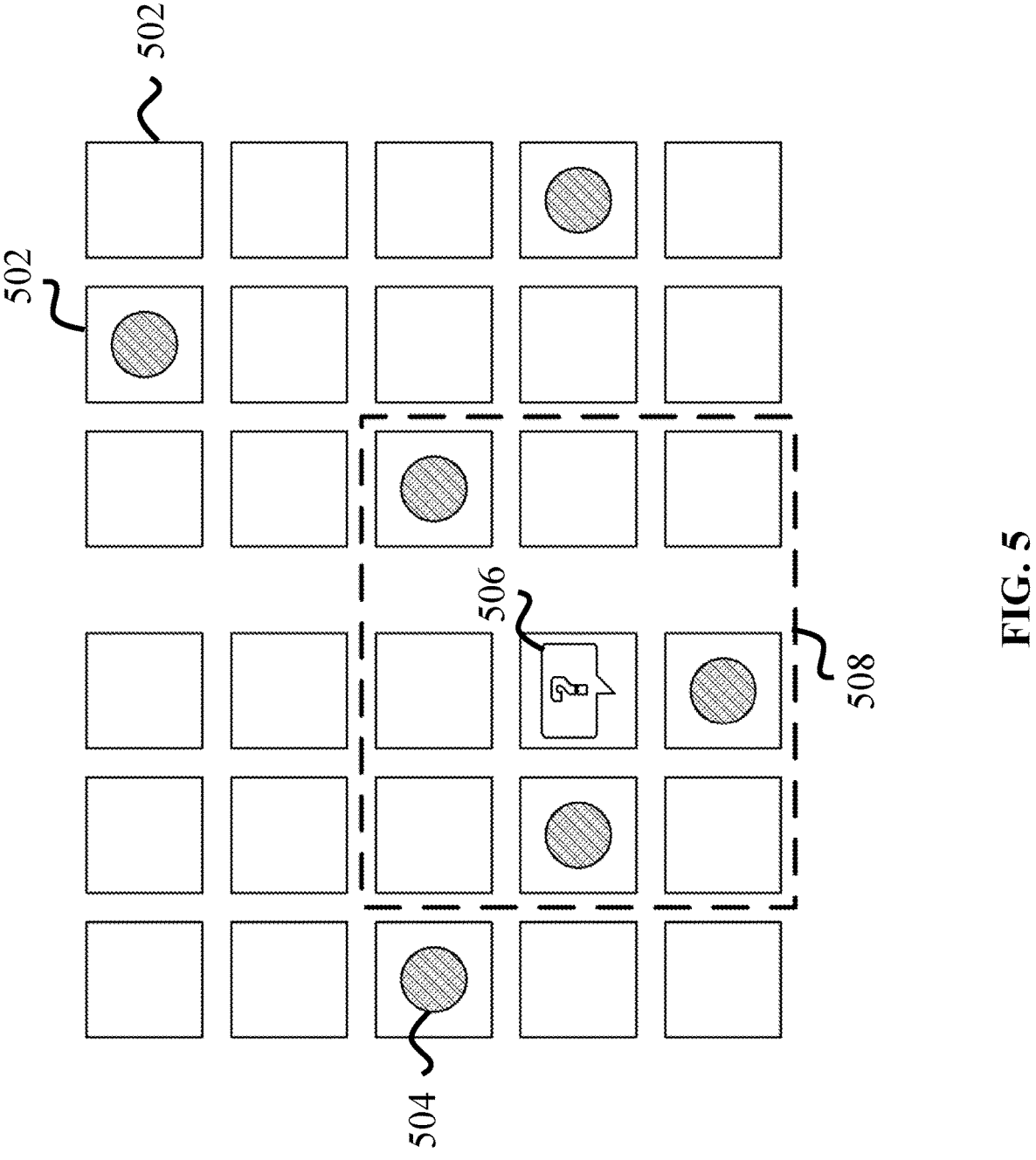
FIG. 5 is a diagram illustrating a plurality of mapped locations and demonstrating a definition of a density zone for management of wireless connection density.

FIG. 5 provides a diagram that demonstrates dynamic and flexible use of density zones and connection tokens to manage spatial density of wireless connections between user devices (e.g., passenger personal electronic devices) and seatback devices 104 (e.g., fixed devices within a vehicle or other spatially dense area). In the illustrated diagram, a plurality of mapped locations 502 are shown. In some embodiments, the mapped locations 502 are in-vehicle locations, for example, locations at which seatback devices 104 are located within a vehicle. Thus, the mapped locations 502 generally represent locations at which wireless connections can be established.

According to example embodiments, a token server stores connection tokens that describe and represent existing wireless connections. In some embodiments, a connection token indicates a particular mapped location at which a wireless connection is active or exists. In the illustrated example, tokens 504 are visually represented to indicate particular ones of the mapped locations 502 at which wireless connections exist. Specifically, within the thirty mapped locations shown in FIG. 5, there are six wireless connections indicated by connection tokens stored in a token server.

Various example operations performed by a connection management system with respect to zone definition and creation will now be described in the context of the illustrated example of FIG. 5. A seatback device at one of the mapped locations 502 receives a connection request 506 from a user device. In some embodiments, the wireless connection is initially or provisionally established based on an allowance received by the seatback device from the connection management system, after which the connection management system performs operations with connection tokens to determine whether the provisional wireless connection should continue. In some embodiments, the seatback device reports the connection request 506 and/or the connection to the connection management system, which then performs a determination to grant or deny the connection based on a presence of nearby wireless connections.

Accordingly, the connection management system defines a density zone 508 surrounding the seatback device in response to the connection request 506. The density zone 508 includes other mapped locations 502 nearby the mapped location 502 at which the connection request 506 occurred. As discussed herein, the size of the density zone 508—or how many and which other mapped locations are considered "nearby"—is defined in zone configuration data obtained by the connection management system, in some examples. In the illustrated example, the density zone 508 is defined as a 3×3 grid of mapped locations 502 surrounding the mapped location 502 at which the connection request 506 occurred. In some embodiments, the connection management system defines the density zone 508 as a list or set of mapped locations 502 based on a seat map or information that describes a spatial layout of the mapped locations 502.

Thus, the density zone 508 identifies locations considered to be near and potentially interfering or disruptive to a wireless connection for the connection request 506. The connection management system determines a number of tokens 504 that correspond to mapped locations 502 within the density zone 508. In the illustrated example, three tokens correspond to mapped locations 502 within the density zone 508, thereby indicating that there are three wireless connections already existing nearby the location of the connection request 506.

The connection management system compares the determined number (e.g., three in the illustrated example) to a capacity or threshold associated with the density zone 508.

In some embodiments, the zone configuration data that defines parameters for the density zone 508 further associates a capacity or threshold with the density zone 508. In some embodiments, a uniform capacity or threshold is applied for all density zones. In some embodiments, the capacity or threshold is a threshold number of tokens for the density zone 508. In some embodiments, the capacity or threshold is based on token parameters, such as passenger demographics. For example, the capacity indicates a threshold number of tokens issued for passengers of a first demographic type, and other tokens issued for passengers of other demographic types are not considered. In some embodiments, the capacity or threshold is a threshold connection or signal power cumulative across wireless connections in the density zone 508, and each token indicates a power for the respective wireless connection.

Based on the comparison, the connection management system determines whether to grant or deny the connection request 506. For the sake of the illustrated example, consider a capacity of five tokens, or five wireless connections, for the density zone 508. Because the total number of wireless connections (according to the tokens) including the provisional or prospective connection for the connection request 506 would be less than five, then the connection request 506 is granted. When granting the connection request 506, the connection management system creates a new token for the connection request 506, such that the new connection is considered for subsequent connection requests.

On the other hand, consider a capacity of three tokens for the density zone 508. The connection management system then denies the connection request 506. In some embodiments, the provisional wireless connection for the connection request 506 is disconnected. Further, in some embodiments, the seatback device presents an interface or alert that restricts connection requests. In some embodiments, the seatback device indicates a predicted time at which a wireless connection would be granted (based on expiration and release of other wireless connections and their tokens).

Thus, as demonstrated in FIG. 5, the determination of whether to grant or deny a connection request 506 is spatially centric to the connection request 506 and is dynamically performed using tokens 504 that describe and represent existing wireless connections. Therefore, technical benefits are provided by controlling a density of wireless connections in a spatial area and minimizing cross-interference of multiple wireless connections.

Figure 6:
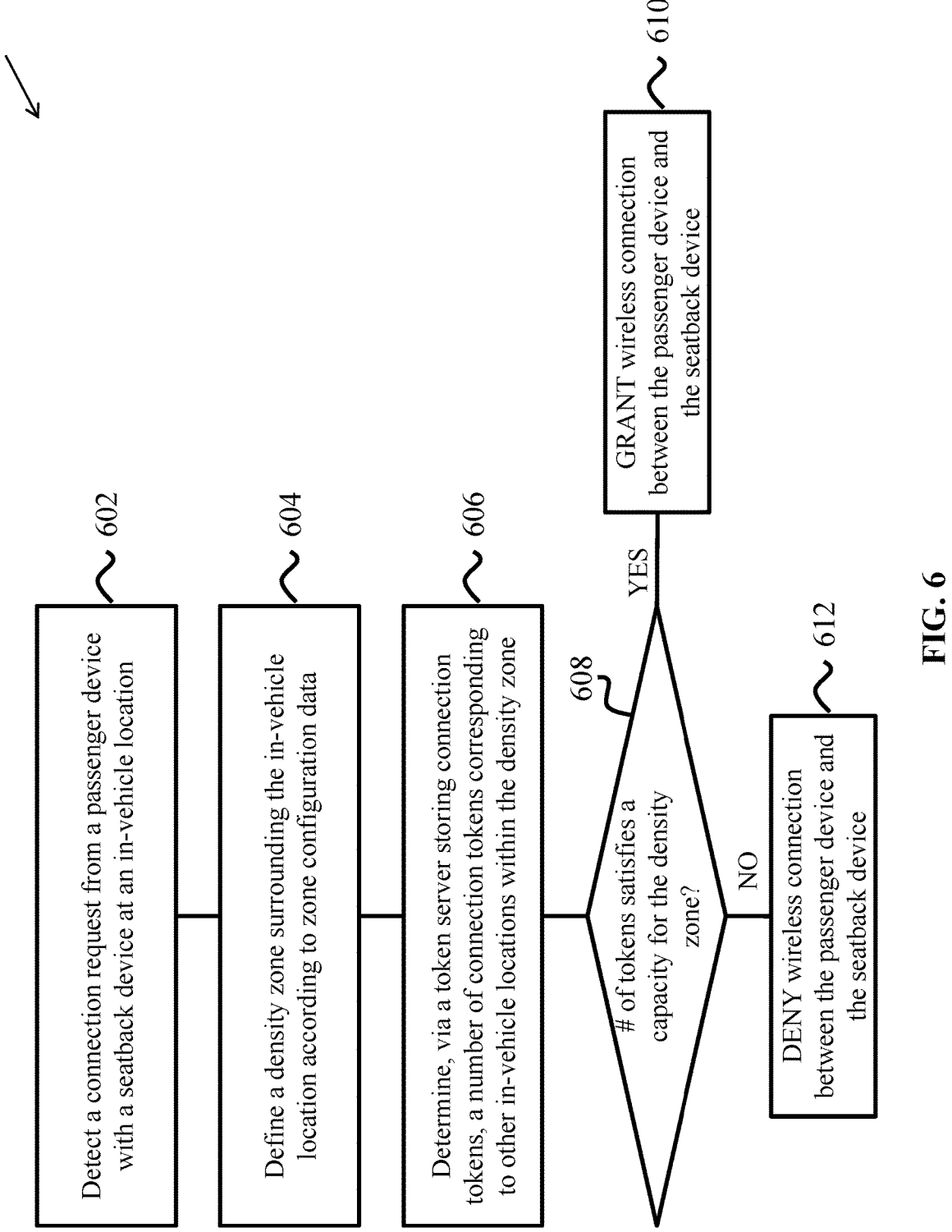
FIG. 6 is a flowchart for an example method of managing or controlling a density of wireless connections.

FIG. 6 shows a flowchart of an example method 600 relating to managing or controlling a density of wireless connections within a vehicle. In some embodiments, the method 600 is performed by a connection management system, for example, a system embodied by the server 106 of FIG. 1, the computing entity 200 of FIG. 2, and/or the onboard server 406 or edge server 406.

At an operation 602, the system detects a connection request from a passenger device with a seatback device at an in-vehicle location. In some embodiments, the seatback device reports to the system that the seatback device received a connection request. In various examples, the connection request is a Bluetooth connection request, a Bluetooth Low Energy connection request, and/or the like. In some embodiments, the system detects the connection request via a device interface, the system communicating with a plurality of seatback devices via the device interface. In some embodiments, the system obtains information related to the passenger device and/or the passenger associated with the passenger device. For example, the system access profile data associated with the passenger to determine passenger demographics.

At an operation 604, the system defines a density zone surrounding the in-vehicle location according to zone configuration data. The density zone defines nearby locations at which wireless communications may be disruptive or interfering with a connection for the connection request. In some embodiments, a size of the density zone is indicated by the zone configuration data. In some embodiments, the system determines a number of in-vehicle locations belonging to the density zone based on respective distances between seatback devices from seat map information. In some embodiments, the size of the density zone is indicated by the zone configuration data with respect to seatback devices. In some embodiments, the system obtains the zone configuration data from a ground server, another vehicle, and/or the like. In some embodiments, the system obtains the zone configuration data based on a type or class of the vehicle, and the zone configuration data is applicable to vehicles of the same type or class.

At an operation 606, the system determines, via a token server storing connection tokens, a number of connection tokens corresponding to other in-vehicle locations within the density zone. The connection tokens describe and represent existing wireless connections, and therefore, the system determines a number of existing wireless connections within the density zone. In some embodiments, the connection tokens include further information relating to the passenger device or passenger involved in the wireless connection. For example, a connection token includes one or more demographic categories for the passenger, a device type of the device, and/or the like. In some embodiments, the token server is located or resides within the vehicle, and the system is coupled with the token server. In some embodiments, the token server parses a list of connection tokens to determine the number of connections tokens corresponding to locations within the density zone. In some embodiments, the token server determines whether each of the locations within the density zone is indicated by a connection token.

At an operation 608, the system determines whether the number of tokens satisfies a capacity for the density zone. In some embodiments, the capacity includes a threshold number of tokens, a threshold connection power cumulatively indicated by the tokens, a threshold number of certain tokens (e.g., tokens that include a certain demographic category of a passenger, tokens that include a certain device type), and/or the like. In some embodiments, the capacity is associated with the density zone in the zone configuration data. In some embodiments, the capacity is uniformly applied to density zones within the vehicle.

If the capacity is satisfied, the system grants a wireless connection between the passenger device and the seatback device at an operation 610. For example, the number of tokens for locations within the density zone is less than a threshold number of tokens defined by the capacity for the density zone. In some embodiments, the system transmits an instruction to the seatback device to establish and/or continue the wireless connection with the passenger device in response to the connection request. In connection to the grant of the wireless connection, the system dynamically creates a new token to represent the wireless connection and stores the new token in the token server, in some embodiments. In some embodiments, each seatback device is associated with either an active token or an inactive token, and the system modifies the inactive token for the seatback device to an active token to reflect the wireless connection being granted and established.

If the capacity is not satisfied, the system denies the wireless connection between the passenger device and the seatback device at an operation 612. For example, the number of tokens for locations within the density zone is at or greater than the threshold number of tokens defined by the capacity for the density zone. In some embodiments, the system transmits an instruction to the seatback device to deny or disconnect the wireless connection being requested. In some embodiments, further operations are performed in connection with the wireless connection being denied. In an example, the system transmits an instruction to the seatback device that causes the seatback device to block subsequent connection requests for a predetermined amount of time. In an example, the system predicts a subsequent point in time at which a wireless connection would be granted (e.g., the number of tokens is predicted to be less than the threshold at the subsequent point in time) and causes requests to be blocked until the subsequent point in time. In an example, the system causes the seatback device to indicate (e.g., display) the subsequent point in time to the passenger to suggest that the passenger re-attempt the connection request then. In an example, the system triggers a token expiration and/or release operation in response o the denial of the wireless connection. In doing so, the system releases tokens whose respective wireless connections have been disconnected, and the system reevaluates whether the capacity is satisfied with the tokens being released. In an example, the system presents an override interface for a crew member of the vehicle that enables the crew member to grant the wireless connection manually.

The method describes example operations for managing one given wireless connection between a passenger device and a seatback device, and the example operations may be performed for each connection request occurring within the vehicle. In some embodiments, the method includes further operations. For example, the method further includes determining that the number of tokens corresponding to locations within the zone has decreased, and permitting a second connection request to occur at the seatback device.

Non-specific to a given wireless connection, the method includes dynamically managing the tokens stored in the token server, in some embodiments. For example, the method further includes renewing or release connection tokens at respective expiration times based on whether the respective wireless connections still exist and/or are still active. In some examples, renewing a connection token includes determining a new expiration time. In some embodiments, the method includes detecting a reboot of a particular seatback device indicated by a connection token and releasing the connection token in response to the reboot.

Thus, this patent document describes various technical solutions involving the management of wireless connections in a spatially-dense setting (e.g., a commercial vehicle). Various technical solutions are provided based on dynamic management of tokens that represent and describe wireless connections and based on defining and evaluating density zones for connection requests.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

The various embodiments introduced herein can be implemented by, for example, programmable circuitry (e.g., one or more microprocessors, programmed with software and/or firmware), or entirely in special-purpose hardwired circuitry (e.g., non-programmable circuitry), or in a combination of such forms. Special-purpose hardwired circuitry may be in the form of, for example, one or more application-specific integrated circuits (ASICs), programmable logic devices (PLDs), field-programmable gate array (FPGAs), etc. In some embodiments, the methods may be stored in the form of computer-executable instructions that are stored on a computer-readable medium. Alternatively, or in addition, cloud-based computing resources may be used for implementing the embodiments.

The embodiments set forth herein represent the necessary information to enable those skilled in the art to practice the embodiments and illustrate the best mode of practicing the embodiments. Upon reading the description in light of the accompanying figures, those skilled in the art will understand the concepts of the disclosure and will recognize applications of these concepts that are not particularly addressed herein. These concepts and applications fall within the scope of the disclosure and the accompanying claims.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

As used herein, unless specifically stated otherwise, terms such as "processing." "computing." "calculating," "determining." "displaying." "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

Reference herein to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

From the foregoing, it will be appreciated that specific embodiments of the invention have been described herein for purposes of illustration, but that various modifications may be made without deviating from the scope of the invention. Accordingly, the invention is not limited except as by the appended claims.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A method comprising:
detecting a connection request from a first passenger device requesting a wireless connection with a first seatback device at a first in-vehicle location within a vehicle having a plurality of seatback devices located at a plurality of in-vehicle locations, wherein the connection request is associated with a first passenger demographic category;
defining a first density zone that includes one or more other in-vehicle locations surrounding the first in-vehicle location according to zone configuration data that indicates a zone size for the first density zone, wherein the zone configuration data further indicates one or more maximum capacities of wireless connections allowed for the first density zone, each maximum capacity corresponding to wireless connections for a particular passenger demographic category;
determining, via a token server that stores connection tokens that each describe an existing wireless connection, a number of particular connection tokens that (i) describe existing connections at the one or more other in-vehicle locations within the first density zone and (ii) indicate a passenger demographic category associated with the existing wireless connection that is the same as the first passenger demographic category associated with the connection request; and
selectively denying the wireless connection between the first passenger device and the first seatback device based at least on comparing the number of particular connection tokens with a particular maximum capacity corresponding to the first passenger demographic category.

2. The method of claim 1, further comprising:
determining, upon receiving a second connection request from the first passenger device, that the number of particular connection tokens is less than the particular maximum capacity; and
selectively permitting, at the first seatback device, the wireless connection between the first passenger device and the first seatback device.

3. The method of claim 1, wherein the denying of the wireless connection comprises transmitting an instruction to the first seatback device to disconnect the wireless connection between the first seatback device and the first passenger device.

4. The method of claim 1, wherein each of the connection tokens stored by the token server is associated with an expiration time, and wherein the method further comprises:
renewing or releasing a given connection token at a respective expiration time based on whether a respective wireless connection described by the given connection token exists at the respective expiration time, wherein renewing the given connection token comprises determining a new expiration time for the given connection token.

5. The method of claim 1, further comprising:
permitting a second wireless connection between a second passenger device and a second seatback device in accordance with a second maximum number of wireless connections allowed for a second density zone that surrounds a second in-vehicle location at which the second seatback device is located; and storing, at the token server, a new connection token that describes the second wireless connection and indicates the second in-vehicle location.

6. The method of claim 1, further comprising:

determining the zone configuration data based on respective distances between the plurality of in-vehicle locations.

7. The method of claim 1, wherein the zone configuration data is received from a ground server based on a layout of the plurality of in-vehicle locations within the vehicle.

8. The method of claim 1, further comprising:

detecting a reboot of a particular seatback device indicated by a particular connection token as having an existing connection with a respective passenger device; and responsive to the reboot, releasing the particular connection token at the token server.

9. The method of claim 1, wherein the token server resides within the vehicle.

10. An in-vehicle system within a vehicle, the in-vehicle system comprising:

a device interface via which the in-vehicle system communicates with a plurality of seatback devices located at a plurality of in-vehicle locations throughout the vehicle to: (i) detect a connection request by a passenger device with a seatback device, and (ii) cause a wireless connection between the passenger device and the seatback device to be permitted or denied;

a token server that stores connections tokens that describe existing wireless connections and indicate in-vehicle locations of respective seatback devices of the existing wireless connections, wherein each connection token indicates a passenger demographic category associated with a respective existing wireless connection; and a connection management module that references the token server to selectively determine whether to permit or to deny the wireless connection between the passenger device and the seatback device based on a number of particular connection tokens that indicate a same passenger demographic category as a first passenger demographic category associated with the connection request and that indicate particular in-vehicle locations within a density zone that includes an in-vehicle location of the seatback device.

11. The in-vehicle system of claim 10, wherein the in-vehicle system causes the wireless connection to be permitted or denied based on transmitting, via the device interface to the seatback device, one of a first instruction to disconnect the wireless connection or a second instruction to continue the wireless connection.

12. The in-vehicle system of claim 10, wherein the connection management module is configured to dynamically define the density zone in response to the connection request being detected.

13. The in-vehicle system of claim 10, wherein the connection management module is configured to define the density zone according to zone configuration data that indicates a zone size and one or more maximum capacities of wireless connections allowed for the first density zone, each maximum capacity corresponding to wireless connections for a particular passenger demographic category.

14. The in-vehicle system of claim 10, wherein the connection management module is configured to:

based on a determination to permit the wireless connection, generate and store a new connection token in the token server, wherein the new connection token describes the wireless connection and indicates the in-vehicle location of the seatback device.

15. The in-vehicle system of claim 10, wherein the connection management module is configured to:

determine, in response to an expiration time of a given token in the token server, whether a given existing wireless connection described by the given token still exists; and responsive to determining that the given existing wireless connection does not exist, releasing the given token.

16. A connection management system comprising at least one processor and a memory storing instructions that, when executed by the at least one processor, cause the connection management system:

detect a connection request from a first passenger device requesting wireless connection with a first seatback device at a first in-vehicle location within a vehicle, wherein the connection request is associated with a first passenger demographic category;

define a first density zone that includes one or more other in-vehicle locations surrounding the first in-vehicle location according to zone configuration data that indicates a zone size for the first density zone, wherein the zone configuration data further indicates one or more maximum capacities of wireless connections allowed for the first density zone, each maximum capacity corresponding to wireless connections for a particular passenger demographic category;

determine, via a token server that stores connection tokens that each describe an existing wireless connection, a number of particular connection tokens that (i) describe existing wireless connections at the one or more other in-vehicle locations within the first density zone and (ii) indicate a passenger demographic category associated with the existing wireless connection that is the same as the first passenger demographic category associated with the connection request; and transmit, to the first seatback device, one of a first instruction to disconnect the wireless connection or a second instruction that permits the wireless connection, wherein the first instruction is transmitted based on the number of particular connection tokens being less than a particular maximum capacity corresponding to the first passenger demographic category and the second instruction is transmitted based on the number of particular connection tokens being at least the particular maximum capacity.

17. The connection management system of claim 16, wherein the instructions further cause the connection management system to:

based on transmitting the second instruction, generate and store a connection token in the token server, wherein the connection token describes the wireless connection between the first passenger device and the first seatback device and indicates the first in-vehicle location.

18. The connection management system of claim 17, wherein generating the connection token includes associating an expiration time with the connection token, wherein the instructions further cause the connection management system to:

determine, at the expiration time, whether the wireless connection between the first passenger device and the first seatback device still exists; and in response to determining that the wireless connection still exists, renewing the connection token based on associating a new expiration time with the connection token.

19. The connection management system of claim 16, wherein the instructions further cause the connection management system to receive the zone configuration data from a ground server located outside of the vehicle.

* * * * *